United States Patent
Kuwata

(10) Patent No.: US 7,536,518 B2
(45) Date of Patent: May 19, 2009

(54) SCALABLE DISC ARRAY UNIT, AND MANAGEMENT METHOD AND MANAGEMENT PROGRAM FOR A SCALABLE DISC ARRAY UNIT

(75) Inventor: Atsushi Kuwata, Tokyo (JP)

(73) Assignee: NEC Corporation, Tokyo (JP)

( * ) Notice: Subject to any disclaimer, the term of this patent is extended or adjusted under 35 U.S.C. 154(b) by 291 days.

(21) Appl. No.: 10/861,344

(22) Filed: Jun. 7, 2004

(65) Prior Publication Data

US 2004/0250020 A1 Dec. 9, 2004

(30) Foreign Application Priority Data

Jun. 9, 2003 (JP) .............................. 2003-164337

(51) Int. Cl.
*G06F 12/00* (2006.01)
(52) U.S. Cl. ...................... 711/153; 711/114; 711/173
(58) Field of Classification Search ................. 711/114, 711/153, 173
See application file for complete search history.

(56) References Cited

U.S. PATENT DOCUMENTS

| | | | | |
|---|---|---|---|---|
| 5,771,383 A | * | 6/1998 | Magee et al. ............... | 719/312 |
| 6,353,869 B1 | * | 3/2002 | Ofer et al. .................... | 710/200 |
| 6,611,903 B2 | * | 8/2003 | Fujimoto et al. ............ | 711/162 |
| 6,823,472 B1 | * | 11/2004 | DeKoning et al. ............ | 714/10 |
| 2001/0014052 A1 | * | 8/2001 | Ayukawa et al. .......... | 365/230.03 |

FOREIGN PATENT DOCUMENTS

| | | |
|---|---|---|
| JP | 08-006858 | 1/1996 |
| JP | 09-128160 | 5/1997 |
| JP | 11-224164 | 8/1999 |
| JP | 2003-15826 | 1/2003 |

OTHER PUBLICATIONS

Bennett, John K. et al., 'Adaptive Software Cache Management for Distributed Shared Memory Architectures', 1990, IEEE, pp. 125-134.*
IBM Technical Disclosure Bulletin, vol. 36, Issue No. 8, pp. 637-638, Aug. 1, 1993.*
Japanese Office Action dated Dec. 12, 2006 with a partial English translation.

* cited by examiner

*Primary Examiner*—Reba I. Elmore
(74) *Attorney, Agent, or Firm*—McGinn IP Law Group, PLLC

(57) ABSTRACT

A disc array unit manages a shared memory as a plurality of shared memory blocks, each including a group of cache pages, performs cache control on these cache pages through use of least recently used (LRU) links, and provides an unavailable link as an LRU link to indicate that an area is not available for use as a cache page. When the shared memory block is used not as a cache memory but for another use, the shared memory block is prevented from being used as a cache memory by re-linking all the cache pages belonging to the shared memory block from an LRU link to such unavailable links individually.

24 Claims, 12 Drawing Sheets

| 311 | 312 |
|---|---|
| SHARED MEMORY BLOCK #0 USE INFORMATION | SHARED MEMORY BLOCK #0 STATE FLAG |
| SHARED MEMORY BLOCK #1 USE INFORMATION | SHARED MEMORY BLOCK #1 STATE FLAG |
| SHARED MEMORY BLOCK #2 USE INFORMATION | SHARED MEMORY BLOCK #2 STATE FLAG |
| SHARED MEMORY BLOCK #3 USE INFORMATION | SHARED MEMORY BLOCK #3 STATE FLAG |

| 311 | 312 |
|---|---|
| SOLUTION A | NOT SHIFTING |
| SOLUTION B | SHIFTING |
| CACHE MEMORY | NOT SHIFTING |
| CACHE MEMORY | NOT SHIFTING |

FIG.11

| 311 | 312 |
|---|---|
| SHARED MEMORY BLOCK #0 USE INFORMATION | SHARED MEMORY BLOCK #0 STATE FLAG |
| SHARED MEMORY BLOCK #1 USE INFORMATION | SHARED MEMORY BLOCK #1 STATE FLAG |
| SHARED MEMORY BLOCK #2 USE INFORMATION | SHARED MEMORY BLOCK #2 STATE FLAG |
| SHARED MEMORY BLOCK #3 USE INFORMATION | SHARED MEMORY BLOCK #3 STATE FLAG |
| SHARED MEMORY BLOCK #4 USE INFORMATION | SHARED MEMORY BLOCK #4 STATE FLAG |
| SHARED MEMORY BLOCK #5 USE INFORMATION | SHARED MEMORY BLOCK #5 STATE FLAG |
| SHARED MEMORY BLOCK #6 USE INFORMATION | SHARED MEMORY BLOCK #6 STATE FLAG |
| SHARED MEMORY BLOCK #7 USE INFORMATION | SHARED MEMORY BLOCK #7 STATE FLAG |

| CACHE MEMORY | SHIFTING |
|---|---|
| CACHE MEMORY | NOT SHIFTING |
| CACHE MEMORY | NOT SHIFTING |
| CACHE MEMORY | NOT SHIFTING |
| UNPOPULATED | NOT SHIFTING |
| UNPOPULATED | NOT SHIFTING |
| UNPOPULATED | NOT SHIFTING |
| UNPOPULATED | NOT SHIFTING |

| 311 | 312 |
|---|---|
| EXTENDED CACHE CONTROL AREA | SHIFTING |
| CACHE MEMORY | SHIFTING |
| CACHE MEMORY | NOT SHIFTING |
| CACHE MEMORY | NOT SHIFTING |
| SOLUTION A | SHIFTING |
| SOLUTION B | NOT SHIFTING |
| CACHE MEMORY | NOT SHIFTING |
| CACHE MEMORY | NOT SHIFTING |

| CACHE PAGE#0 LRU LINK POINTER | | CACHE PAGE#0 SEARCH LINK POINTER | |
|---|---|---|---|
| FORWARD | BACKWARD | FORWARD | BACKWARD |
| CACHE PAGE#1 LRU LINK POINTER | | CACHE PAGE#1 SEARCH LINK POINTER | |
| FORWARD | BACKWARD | FORWARD | BACKWARD |
| ⋮ | | ⋮ | |
| CACHE PAGE#N-2 LRU LINK POINTER | | CACHE PAGE#N-2 SEARCH LINK POINTER | |
| FORWARD | BACKWARD | FORWARD | BACKWARD |
| CACHE PAGE#N-1 LRU LINK POINTER | | CACHE PAGE#N-1 SEARCH LINK POINTER | |
| FORWARD | BACKWARD | FORWARD | BACKWARD |

} SHARED MEMORY BLOCK #4 CACHE PAGE MANAGEMENT TABLE

| CACHE PAGE#0 LRU LINK POINTER | | CACHE PAGE#0 SEARCH LINK POINTER | |
|---|---|---|---|
| FORWARD | BACKWARD | FORWARD | BACKWARD |
| CACHE PAGE#1 LRU LINK POINTER | | CACHE PAGE#1 SEARCH LINK POINTER | |
| FORWARD | BACKWARD | FORWARD | BACKWARD |
| ⋮ | | ⋮ | |
| CACHE PAGE#N-2 LRU LINK POINTER | | CACHE PAGE#N-2 SEARCH LINK POINTER | |
| FORWARD | BACKWARD | FORWARD | BACKWARD |
| CACHE PAGE#N-1 LRU LINK POINTER | | CACHE PAGE#N-1 SEARCH LINK POINTER | |
| FORWARD | BACKWARD | FORWARD | BACKWARD |

} SHARED MEMORY BLOCK #5 CACHE PAGE MANAGEMENT TABLE

| CACHE PAGE#0 LRU LINK POINTER | | CACHE PAGE#0 SEARCH LINK POINTER | |
|---|---|---|---|
| FORWARD | BACKWARD | FORWARD | BACKWARD |
| CACHE PAGE#1 LRU LINK POINTER | | CACHE PAGE#1 SEARCH LINK POINTER | |
| FORWARD | BACKWARD | FORWARD | BACKWARD |
| ⋮ | | ⋮ | |
| CACHE PAGE#N-2 LRU LINK POINTER | | CACHE PAGE#N-2 SEARCH LINK POINTER | |
| FORWARD | BACKWARD | FORWARD | BACKWARD |
| CACHE PAGE#N-1 LRU LINK POINTER | | CACHE PAGE#N-1 SEARCH LINK POINTER | |
| FORWARD | BACKWARD | FORWARD | BACKWARD |

} SHARED MEMORY BLOCK #6 CACHE PAGE MANAGEMENT TABLE

| CACHE PAGE#0 LRU LINK POINTER | | CACHE PAGE#0 SEARCH LINK POINTER | |
|---|---|---|---|
| FORWARD | BACKWARD | FORWARD | BACKWARD |
| CACHE PAGE#1 LRU LINK POINTER | | CACHE PAGE#1 SEARCH LINK POINTER | |
| FORWARD | BACKWARD | FORWARD | BACKWARD |
| ⋮ | | ⋮ | |
| CACHE PAGE#N-2 LRU LINK POINTER | | CACHE PAGE#N-2 SEARCH LINK POINTER | |
| FORWARD | BACKWARD | FORWARD | BACKWARD |
| CACHE PAGE#N-1 LRU LINK POINTER | | CACHE PAGE#N-1 SEARCH LINK POINTER | |
| FORWARD | BACKWARD | FORWARD | BACKWARD |

} SHARED MEMORY BLOCK #7 CACHE PAGE MANAGEMENT TABLE

SCALABLE DISC ARRAY UNIT, AND MANAGEMENT METHOD AND MANAGEMENT PROGRAM FOR A SCALABLE DISC ARRAY UNIT

BACKGROUNDS OF THE INVENTION

1. Field of the Invention

The present invention relates to a disc array unit, and more particularly, to a disc array unit management system which can improve availability and scalability of the disc array unit.

2. Description of the Related Art

In recent years, an increasing number of organizations are building their storage network by connecting multiple servers around a large-capacity disc array unit, with the view to ensure various advantages, including more efficient use of capacity, more highly integrated management, and faster backup performance.

For organizations operating such a system, the reliability, availability and scalability of the disc array unit are of critical importance. A typical disc array unit has dual components in order to prevent a single failure from causing the entire unit to go down, and is designed to be highly scalable by allowing for the addition of discs, cache memories and controllers with ease without interrupting the operation of the entire unit. Examples of such a disc array unit include the units disclosed in Japanese Patent Laying-Open (Kokai) No. 2003-15826 Official Gazette (Literature 1) and Japanese Patent Laying-Open (Kokai) No. Heisei 11-224164 Official Gazette (Literature 2).

In addition, it is becoming common for a disc array unit to support various storage solutions for higher functionality. These solutions are typically implemented in the disc array unit as software to provide a range of additional functions, such as data backup, creation of duplicate volumes, performance optimization, virtualization and load distribution. Once these additional functions are incorporated, the disc array unit can perform data backup and various other functions as listed above by interoperating with storage management servers or operations servers.

In order to implement these solutions (additional functions), a wide variety of management information must be held in the shared memory of the disc array unit. Since a typical disc array unit is inherently provided with a large-capacity cache memory, there are no difficulties in sparing only a small portion of the cache memory for use as an area for management information.

However, solutions to be incorporated in a disc array unit are becoming wider in variety, sometimes causing a problem of requiring a considerable portion of its memory capacity to be used as a management area for these solutions. This problem can be addressed by use of hardware, which has recently experienced a considerable improvement in scalability. A user can implement a cache memory that can meet the current capacity requirement and extend the memory capacity as necessary anytime in the future. Along with this trend toward a highly flexible extension of memory capacity, it is becoming increasingly important also to achieve scalability in terms of adding solutions, so that a solution can be implemented (incorporated) as it becomes necessary.

Some solutions require a large memory capacity for storage of management information. Therefore, it is desirable that implementation of an additional memory for management information is not necessary when the user does not have such a solution incorporated, but once the user decides to incorporate such a solution, the user can add the solution (function) dynamically without needing to stop the unit even while it is operating.

As described above, scalability in terms of adding solutions is becoming increasingly important, and it is thus desirable that (a) if the user does not need to use a solution that requires a large-capacity memory for management information, the user does not have to implement an additional memory for storage of management information; and (b) if the user should need such a solution in the future, the user can add the solution (function) dynamically without needing to stop the unit even while it is operating. Many of conventional disc array units deal with such over-time changes in user needs by initially securing ample memory area for storage of management information on the assumption that the user may incorporate and use a variety of solutions in the future. This means that a user who needs few or no solutions must tolerate inefficiency that arises from having an additional wasteful memory that will never be used. Furthermore, a conventional disc array unit typically requires the memory map to be updated whenever a solution is incorporated, making it extremely difficult for the user to extend the existing functions dynamically without stopping the operation of the disc array unit itself.

Some manufacturers expect users to add a shared memory when they add solutions (additional functions) or extend an existing cache memory size to a larger one. However, most manufacturers have conventionally secured more than adequate memory area for storage of management information in anticipation of a future increase in memory capacity through the addition of a memory. In this case, if a memory is not added as anticipated, the redundant memory area initially secured will be wasteful, leading to unnecessary loss in memory efficiency.

SUMMARY OF THE INVENTION

An object of the present invention is to solve the above-stated challenges faced by conventional disc array units by providing a disc array unit, a disc array unit management method and a disc array unit management program wherein, when a shared memory is to be used for additional functions, this change can be conducted without stopping the unit and thus a disc array unit with higher availability and scalability can be realized.

Another object of the present invention is to provide a disc array unit, a disc array unit management method and a disc array unit management program which can enable highly efficient use of memory capacity by, when a shared memory is extended, allowing an area for memory management to be set dynamically.

According to the first aspect of the invention, a disc array unit which allows a user to implement an additional function with specific capabilities as necessary, comprises setting automatically a particular area in the shared memory for a cache memory or storage of management information needed to realize the additional function to be incorporated.

In the preferred construction, when the additional function is incorporated, setting automatically a particular area in the shared memory being used as the cache memory to a new use for storage of management information needed to realize the additional function; and when the additional function is removed, setting automatically a particular area in the shared memory being used for storage of management information to realize the additional function to a new use as the cache memory.

In another preferred construction, removing from control for use as a cache memory a particular area in the shared memory, which has been set to a use for storage of management information to implement the additional function.

In another preferred construction, if any unwritten data exists in the cache memory, which is now set to a use for storage of management information to implement the additional function, purging the cache memory after writing the data to a disc.

In another preferred construction, providing in part of the shared memory a management area for storage of management information needed to manage uses of different areas in the shared memory; and changing a particular area in the shared memory for the cache memory or storage of management information needed to implement the additional function, by specifying the cache memory or the additional function as a use of the particular area for indication in the management area.

In another preferred construction, in management information concerning the management area, providing a flag to indicate if the area is shifting to another use.

In another preferred construction, when the shared memory is extended, setting automatically a particular area, existing in the shared memory before extension, as an area for storage of control information concerning the area to be newly created as a result of the extension of the shared memory.

In another preferred construction, purging data contained in a particular area in the shared memory being used as the cache memory; and setting automatically such particular area as an area for storage of control information concerning the area to be newly created as a result of the extension of the shared memory.

According to another aspect of the invention, a disc array unit which can manage a shared memory as a plurality of shared memory blocks, each of which consists of a group of cache pages, and perform cache control on these cache pages through use of LRU links, comprises providing in addition to the Least Recently Used (LRU) links an unavailable link to indicate that an area is not available, so that, when the shared memory block is used not as the cache memory but for another use, the shared memory block can be prevented from being used as cache memories by re-linking all the cache pages belonging to the shared memory block from the LRU link to such unavailable links individually.

According to another aspect of the invention, a disc array unit management method which allows a user to implement an additional function with specific capabilities as necessary, comprising the step of setting automatically a particular area in the shared memory for a cache memory or storage of management information needed to realize the additional function to be incorporated.

In the preferred construction, the disc array unit management method, comprising the steps of when the additional function is incorporated, setting automatically a particular area in the shared memory being used as the cache memory to a new use for storage of management information needed to realize the additional function; and when the additional function is removed, setting automatically a particular area in the shared memory being used for storage of management information to realize the additional function to a new use as the cache memory.

In another preferred construction, the disc array unit management method, comprising the step of from control for use as a cache memory, removing a particular area in the shared memory which has been set to a use for storage of management information to implement the additional function.

In another preferred construction, the disc array unit management method, comprising the step of if any unwritten data exists in the cache memory, which is now set to a use for storage of management information to implement the additional function, purging the cache memory after writing the data to a disc.

In another preferred construction, the disc array unit management method, comprising the steps of providing in part of the shared memory a management area for storage of management information needed to manage uses of different areas in the shared memory; and changing a particular area in the shared memory for the cache memory or storage of management information needed to implement the additional function, by specifying the cache memory for the additional function as a use of the particular area for indication in the management area.

In another preferred construction, the disc array unit management method, comprising the step of in management information concerning the management area, providing a flag to indicate if the area is shifting to another use.

In another preferred construction, the disc array unit management method, comprising the step of when the shared memory is extended, setting automatically a particular area, existing in the shared memory before extension, as an area for storage of control information concerning the area to be newly created as a result of the extension of the shared memory.

In another preferred construction, the disc array unit management method, comprising the steps of purging data contained in a particular area in the shared memory being used as the cache memory; and setting automatically such particular area as an area for storage of control information concerning the area to be newly created as a result of the extension of the shared memory.

According to another aspect of the invention, a disc array unit management method to manage a shared memory as a plurality of shared memory blocks, each of which consists of a group of cache pages, and perform cache control on these cache pages through use of LRU links, comprising the step of when the shared memory block is used not as a cache memory but for another use, preventing the shared memory block from being used as cache memories by re-linking all the cache pages belonging to the shared memory block each from the LRU link to an unavailable link individually, which is provided in addition to the LRU links, to indicate that an area is not available.

According to another aspect of the invention, a disc array unit management program run by a disc array unit which allows a user to implement an additional function with specific capabilities as necessary, comprising the function of setting automatically a particular area in the shared memory for a cache memory or storage of management information needed to realize the additional function to be incorporated.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 4 is a diagram describing the contents of the shared memory block management area within the shared memory according to the first embodiment;

FIG. 5 is a diagram showing example states of the shared memory block management area;

FIG. 11 is a diagram describing the contents of the shared memory block management area within the shared memory according to the second embodiment;

FIG. 12 is a diagram showing example states of the shared memory block management area before a shared memory is added;

FIG. 13 is a diagram showing example states of the shared memory block management area after a shared memory is added; and FIG. 14 is a diagram describing the contents of the cache control area within the shared memory according to the second embodiment.

DESCRIPTION OF THE PREFERRED EMBODIMENT

Figure 1:
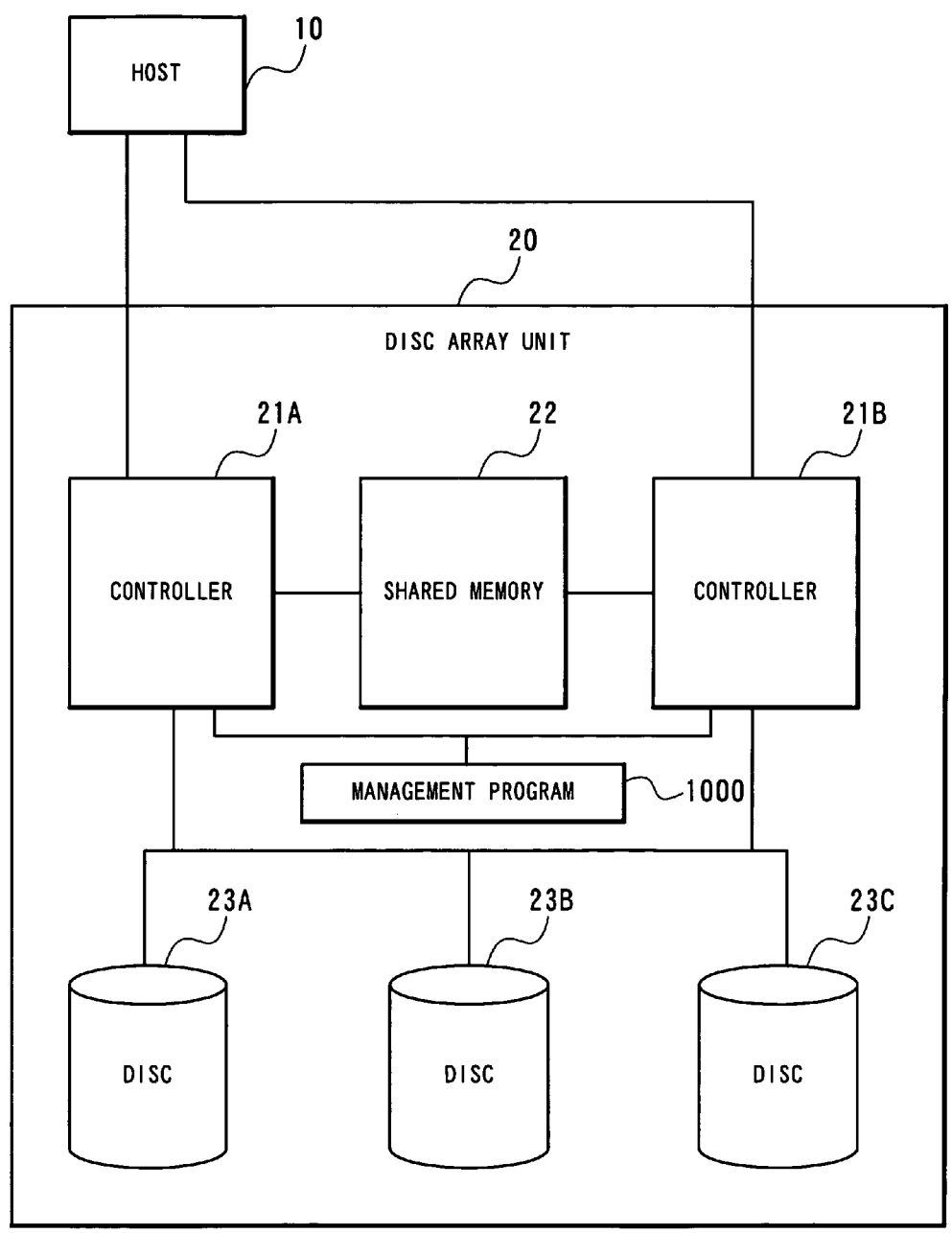
FIG. 1 is a block diagram showing the configuration of a disc array unit according to the first embodiment of the present invention.

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessarily obscuring the present invention.

The preferred embodiments of the present invention will now be described in detail by referring to the drawings.

FIG. 1 is a block diagram showing the configuration of a disc array unit according to the first embodiment of the present invention.

A system according to this embodiment comprises a host 10, which may be a storage management server, an operations server or other similar component; and a disc array unit 20; wherein the disc array unit 20 further comprises a plurality of controllers 21A, 21B, a shared memory 22, and a plurality of discs 23A, 23B, 23C.

The shared memory 22 of the disc array unit 20 is read/write accessible from all the controllers 21A, 21B. The controllers 21A, 21B control data transfers among the host 10, the shared memory 22 and the discs 23A, 23B, 23C, based on commands sent from the host 10.

The controllers 21A, 21B are realized by the program-controllable computer processing part (referred to also as central processing unit or CPU) and perform management by running a management program 1000 designed to manage shared memory blocks within the shared memory 22 as cache memories or a management area for solutions. This management program 1000 is stored in a magnetic disc, semi-conductor memory or other storage medium and is loaded from the storage medium into the memory of the computer processing part (CPU), namely the controllers 21A, 21B, to realize various functions needed for management by controlling the computer processing part.

Figure 2:
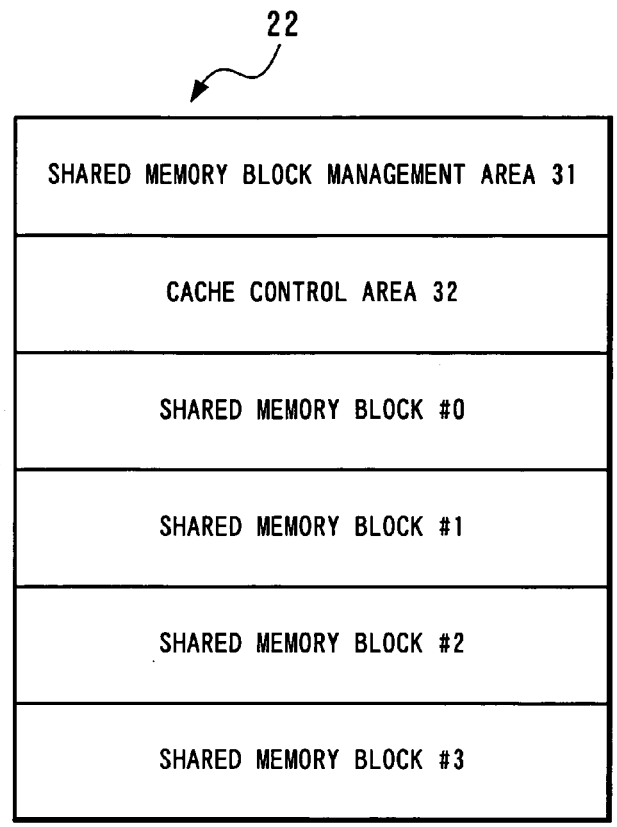
FIG. 2 is a diagram showing an example allocation of shared memory segments for the disc array unit according to the first embodiment of the present invention.

FIG. 2 shows an example configuration of the shared memory 22. As shown in this figure, the shared memory 22 comprises a shared memory block management area 31 to store management information concerning the shared memory block; a cache control area 32; and shared memory blocks #0 to #3 which are used as cache memories or management areas to implement solutions.

The shared memory block management area 31 is an area to store shared memory block management information 310, which is used to manage the states of the shared memory blocks #0 to #3. The cache control area 32 is an area to store cache control information 320, which is used to realize cache functions by utilizing a shared memory block as a cache memory. These cache functions are controlled by the controllers 21A, 21B.

The shared memory blocks #0 to #3 are areas used for storage of management information concerning cache memories or solutions. If assigned for use as a cache memory segment, a shared memory block functions as a cache memory for data transfers between the host 10 and the discs 23A, 23B, 23C. If assigned for use for solutions, it is utilized as areas for storage of management information needed to implement solutions (additional functions).

Management information needed to implement a solution (additional function) depends on the functions that the solution provides. For example, if the solution provides backup functions, management information needed to implement the solution will be a differential map for a particular volume between before and after an update. In this case, every time the volume is updated, the update difference will be stored in the shared memory block allocated for use for the solution. If the solution provides virtual disc functions, a table showing correspondence between logical address and physical address will be stored as management information in the shared memory block allocated for use for the solution. Thus, management information to be stored will vary depending on the type of solution (additional function).

Figure 3:
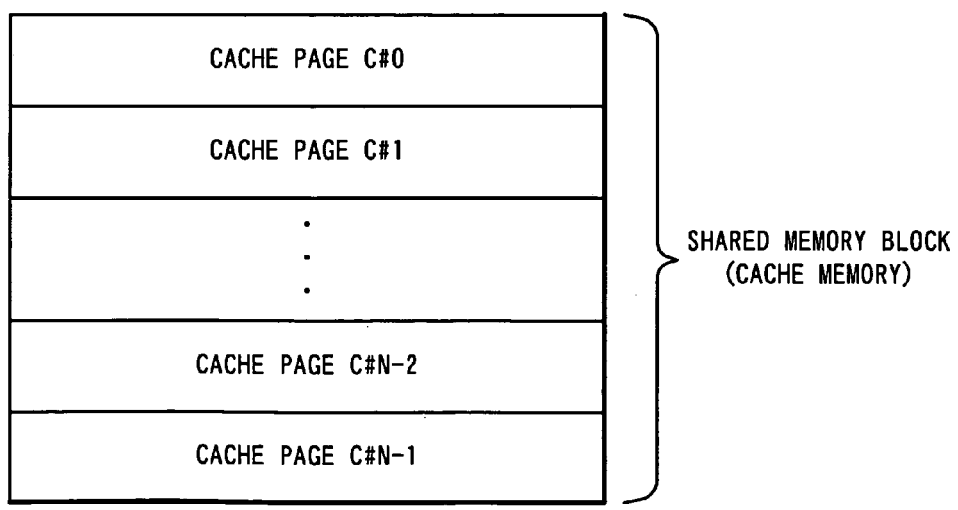
FIG. 3 is a diagram showing the allocation of a shared memory block within the shared memory according to the first embodiment.

FIG. 3 shows the contents of a shared memory block #0 to #3 when it is used as a cache memory. As shown in this figure, the shared memory block (any of #0 to #3) consists of an n number of cache pages C#0 to C#N−1. A cache page is a unit of allocation when data is stored temporarily. When a shared memory block #0 to #3 is utilized as an area for a solution, it is not dependent on the division of the shared memory block into cache pages; instead, it is used as necessary according to the solution.

FIG. 4 shows example contents of shared memory block management information 310 stored in the shared memory block management area 31. This shared memory block management information 310 includes (i) use information 311, which indicates the respective use types of the shared memory blocks #0 to #3, and (ii) a state flag 312, which indicates whether or not each block is shifting to another use.

The shared memory block management information 310 stored in the shared memory block management area 31 is managed by the controllers 21A and 21B. If a particular solution is incorporated in the disc array unit 20 by the user, a use of the predetermined shared memory block will be set automatically in use information 311 to indicate that the management information 310 is for use for the incorporated solution. If the incorporated solution is removed, a new use of the shared memory block being used for the solution will be set in use information 311 to indicate that the management information 310 is now for use for a cache memory or another solution.

While a shared memory block is in a normal state, that is, while it is being used as a cache memory or for a solution, the state flag 312 is set to "not shifting." If the shared memory block is the subject of a use change process (as described in FIG. 8 below), then the state flag 312 will be set to "shifting."

FIG. 5 shows example contents of shared memory block management information 310. In this example, the use of the shared memory block #0 is "Solution A" and that of the shared memory block #1 is "Solution B." The use of the shared memory blocks #2 and #3 is "Cache memory." The state flag 312 indicates that the shared memory block #1 is "Shifting" to a new use.

Figure 6:
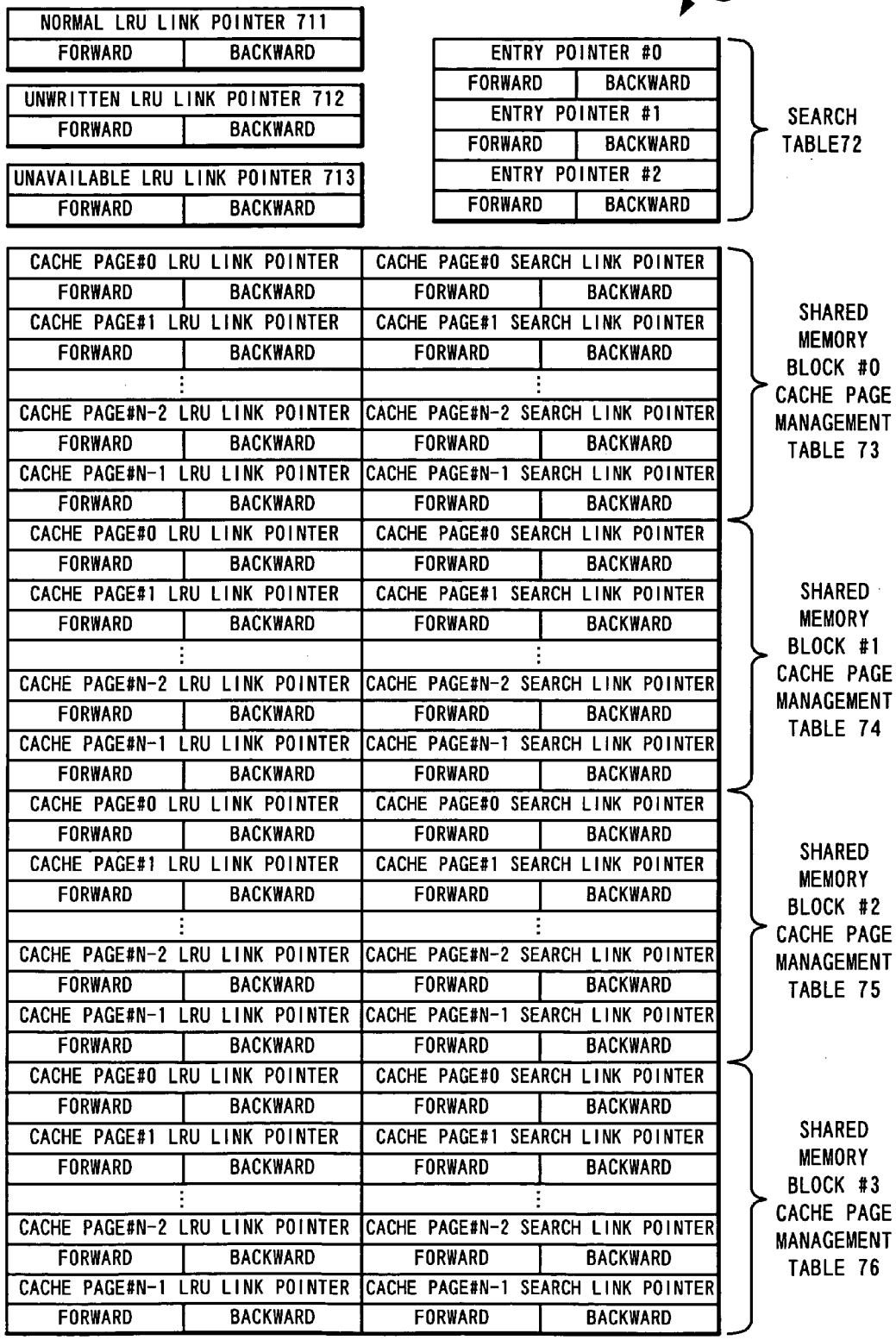
FIG. 6 is a diagram describing the contents of the cache control area within the shared memory according to the first embodiment.

FIG. 6 shows example contents of cache memory control information 320. Assuming that all the shared memory blocks are used as cache memories, one cache page (#0 to #N-1) LRU link pointer, stored in the cache page management tables 73 to 76 for the shared memory blocks #0 to #3, exists for each of the cache pages. By this, it is indicated which LRU link pointer, as well as which search link pointer, the cache page is linked with.

One LRU link pointer has three kinds of link pointers. These links pointers are linked bidirectionally with the normal LRU link pointer 711, unwritten LRU link pointer 712, and the unavailable LRU link pointer 713, respectively, with these latter serving as the starting points in the bidirectional linkage.

The normal LRU link pointer 711 is a link pointer to which a cache page storing the same data as those on the discs 23A to 23C will be linked, and gives a cache hit when it is read from the host 10. This cache page can be purged by a push out control process anytime. For example, in FIG. 6, the forward section of the normal LRU link pointer 711 contains the cache page #0 LRU link pointer for the shared memory block #0.

To the unwritten LRU link pointer 712, a cache page, storing the data for which a write request has been issued from the host 10 but which is yet to be written to the discs 23A to 23C, will be linked; the data will be written to the discs 23A to 23C whenever appropriate by a background process. This cache page cannot be purged until all the data is written to the discs 23A to 23C.

The unavailable LRU link pointer 713 is a pointer newly provided by the present invention. To this pointer, a cache page that is not available as a cache memory will be linked. In other words, a cache page, which belongs to a shared memory block and which is being used for a use other than a cache memory, will be linked to this pointer. The cache page in this link will never be used as a cache memory. However, once the use of the shared memory block is changed to a cache memory, the cache page will be shifted to a normal LRU link 711 and be available for use as a cache memory.

The purpose of using an unavailable LRU link pointer 713 is to indicate that the cache page in the link cannot be used as a cache memory.

A search table 72 is used to enable faster hit/not hit evaluation for a cache page, and will be linked from an entry pointer, which is determined uniquely from an address, to a cache page (#0 to #N-1) search link pointer. A cache page linked to the normal LRU link pointer 711 or the unwritten link pointer 712 is always linked to an appropriate entry pointer of the search table 72. On the other hand, a cache page linked to the unavailable link pointer 713 is not linked to any entry pointer.

Various operations according to the first embodiment above will now be described with reference to the figures.

First, following the flow chart in FIG. 7, the cache memory control operation according to this embodiment will be described. Upon receiving a command (read or write) from the host 10 (Step 701), the unit performs a hit/not hit evaluation process for a particular cache page by using the requested address as a key (Step 702).

If the evaluation gives a "hit" for the cache page, the unit removes the link to this cache page from the normal LRU link pointer 711 (Step 704).

If the evaluation gives a "not hit" for the cache page, the unit performs a purge process, wherein it removes the cache page located at the end of the normal LRU link pointer 711 from the search table 72 and re-links the cache page to a new search table (Step 703). It then removes the cache page from the normal LRU link pointer 711 (Step 704).

The disc array unit then performs a data transfer as appropriate based on the command from the host 10 (Step 705). Upon completion of the data transfer, it determines if there is any data that is yet to be written to the discs 23A, 23B, 23C (Step 706). If there is no such data, it links the cache page to the normal LRU link pointer 711 (Step 707). Otherwise, if there is such data, it links the cache page to the unwritten LRU link pointer 712 (Step 708).

Next, following the flow chart in FIG. 8, the operation according to this embodiment, wherein a shared memory block allocated as a cache memory is changed to a use for a particular solution (additional function), will be described.

When a particular solution (additional function) is incorporated, the disc array unit sets the state flag 312 of a shared memory block allocated as a cache memory to "Shifting" (Step 801). This indicates that the shared memory block is shifting to a new use.

The unit then removes the cache pages belonging to this shared memory block one by one from the normal LRU link pointer 711 or the unwritten link pointer 712 (Step 802), and examines each cache page to determine whether it contains data that is yet to be written to the discs (Step 803).

If the cache page contains such data, the unit writes the data to the discs 23A to 23C (Step 804). Since this cache page does not have to be evaluated for a cache hit, the unit removes the link to the cache page from the entry pointer of the search table 72 (Step 805), and links it to the unavailable LRU link pointer 713 (Step 806).

If the cache page is not located at the end of the shared memory block (Step 807), the disc array unit returns to Step 802 and repeats Steps 802 to 806 on the next cache page. Upon completing linking all the cache pages belonging to this shared memory block to the unavailable LRU link pointer 713 ("Yes" in Step 807), use information 311 for the shared memory block is changed from a cache memory to a management information concerning the incorporated solution (Step 808). An area for storage of management information is now secured, making the solution available to the user.

Finally, following the flow chart in FIG. 9, the operation according to this embodiment, wherein the shared memory block allocated for storage of management information concerning a solution (additional function) is changed to a use as a cache memory upon the removal of the solution, will be described.

The disc array unit first sets the state flag 312 of the shared memory block, which has been allocated for management of a particular solution and whose use is to be changed to "a cache memory," to "Shifting" (Step 901). This indicates that the shared memory block is shifting to a new use.

The unit then links the cache pages belonging to the shared memory block to the normal LRU link pointers 711 one by one (Step 902), and links each page to the entry pointer of the search table 72 so that a cache hit evaluation can be performed (Step 903).

The unit also removes each of the cache pages belonging to the shared memory block from the unavailable LRU link pointer 713 (Step 904).

If the cache page is not located at the end of the shared memory block (Step 905), the disc array unit returns to Step 902 and repeats Steps 902 to 904 on the next cache page. Upon completing the necessary processes for all the cache pages belonging to this shared memory block ("Yes" in Step 905), use information 311 for the shared memory block is changed from a management information area for the incorporated solution to a cache memory (Step 906). This makes these cache pages available for use as a cache memory.

According to this embodiment, a disc array unit can be extended by incorporating a solution during operation because part of the shared memory being used as a cache memory can be changed dynamically to an area for use for the solution. Furthermore, a disc array unit with higher availability and scalability can be realized because the unit does not have to be stopped while a solution is being incorporated.

A disc array unit management method according to the second embodiment of the present invention will now be described. The configuration of the disc array unit according to this embodiment is the same as the one shown in FIG. 1.

This embodiment focuses on extending dynamically a control area for storage of control information concerning cache memories, instead storage of control information concerning solutions. When the capacity of a shared memory 22 is extended by use of hardware and if the extended area is used as a cache memory, the required size of the cache control area 32 also increases.

Since the cache control area 32 is smaller than the capacity of the entire shared memory 22, dynamic extension is possible only if the cache control area 32 was initially built to be able to support the maximum cache capacity in anticipation of the addition of a memory. If, however, the difference between a cache with the minimum capacity and that with the maximum capacity is extremely large, a problematic situation may possibly arise where as large a cache control area 32 as needed for the maximum-capacity cache must be used to cater to the minimum-capacity cache, leading to a considerable reduction in the overall amount of capacity that can actually be used as cache memories. According to this embodiment, an appropriate amount of cache control area can be secured correspondingly to the capacity of the shared memory 22.

The initial state of the management information area 30 of the shared memory 22 according to this embodiment, shown in FIG. 2, is the same as that of the shared memory 22 according to the first embodiment. The state of the shared memory 22 after extension by use of hardware is as shown in FIG. 10.

Figure 10:
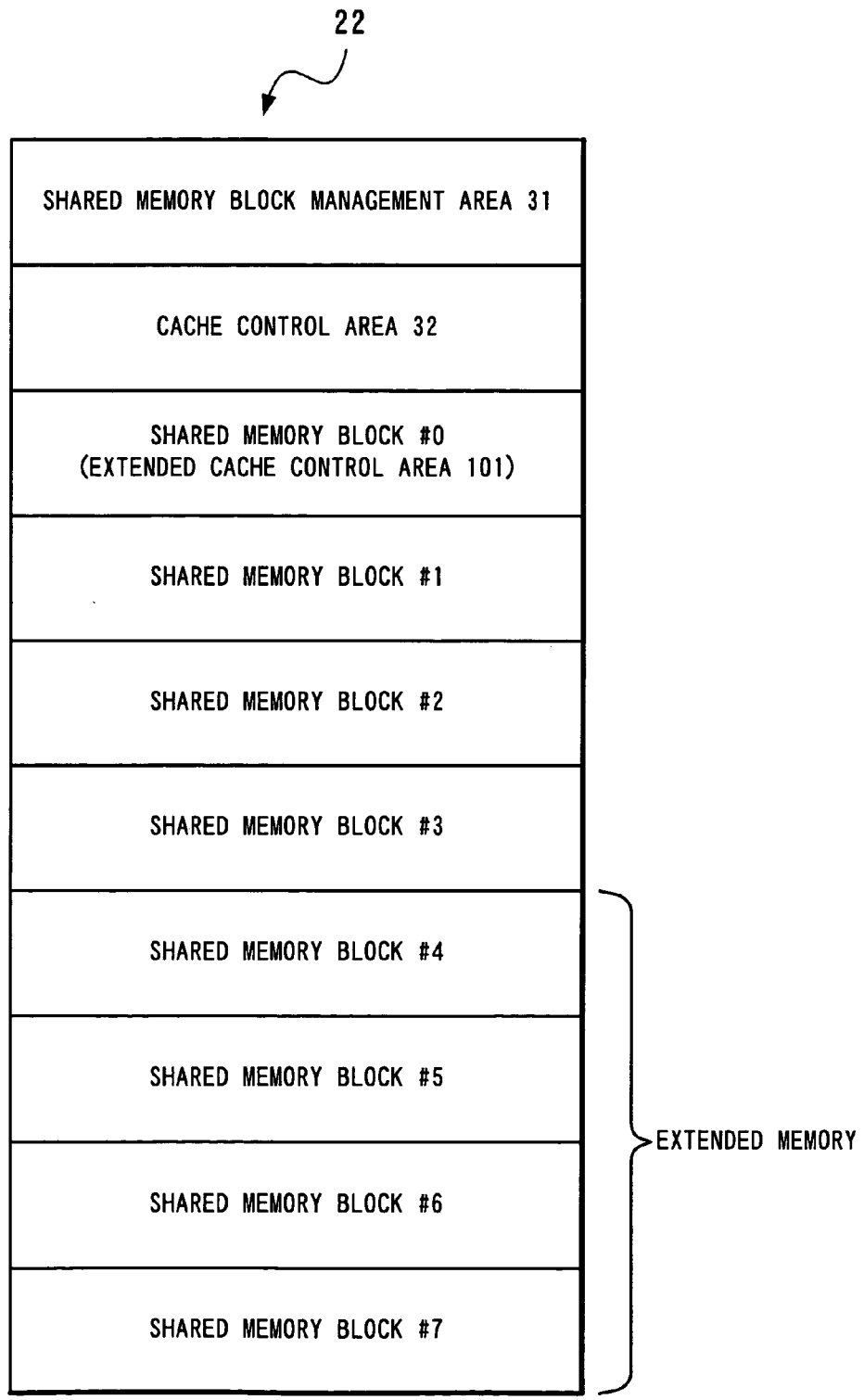
FIG. 10 is a diagram showing an example allocation of shared memory segments for the disc array unit according to the second embodiment of the present invention.

In FIG. 10, the shared memory 22 has been extended to newly include shared memory blocks #4 to #7. One of the initial blocks, the shared memory block #0, is allocated as an extended cache control area 101 for storage of extended cache control information 1010, which is needed to enable the shared memory blocks #4 to #7 to be used as cache memories.

In order to realize this operation, the shared memory block management area 31 according to this embodiment stores a use 311 associated with each of the shared memory blocks #0 to #7 and shared memory block management information 310 to be used for management of the state flag 312, as shown in FIG. 11.

FIG. 12 shows the state before the extension of the shared memory 22. As shown in this figure, the shared memory blocks #0 to #3 were used as cache memories and the cache memories #4 to 7 were managed as unpopulated areas.

FIG. 13 shows the state after the extension of the shared memory 22. Upon the extension of the shared memory 22, a shifting process is performed. The shared memory block #0 is now used as an extended cache control area 101; the newly added shared memory blocks #4 and #5 are used for Solutions A and B; and the shared memory blocks #6 and #7 are now available for use as cache memories.

Figure 8:
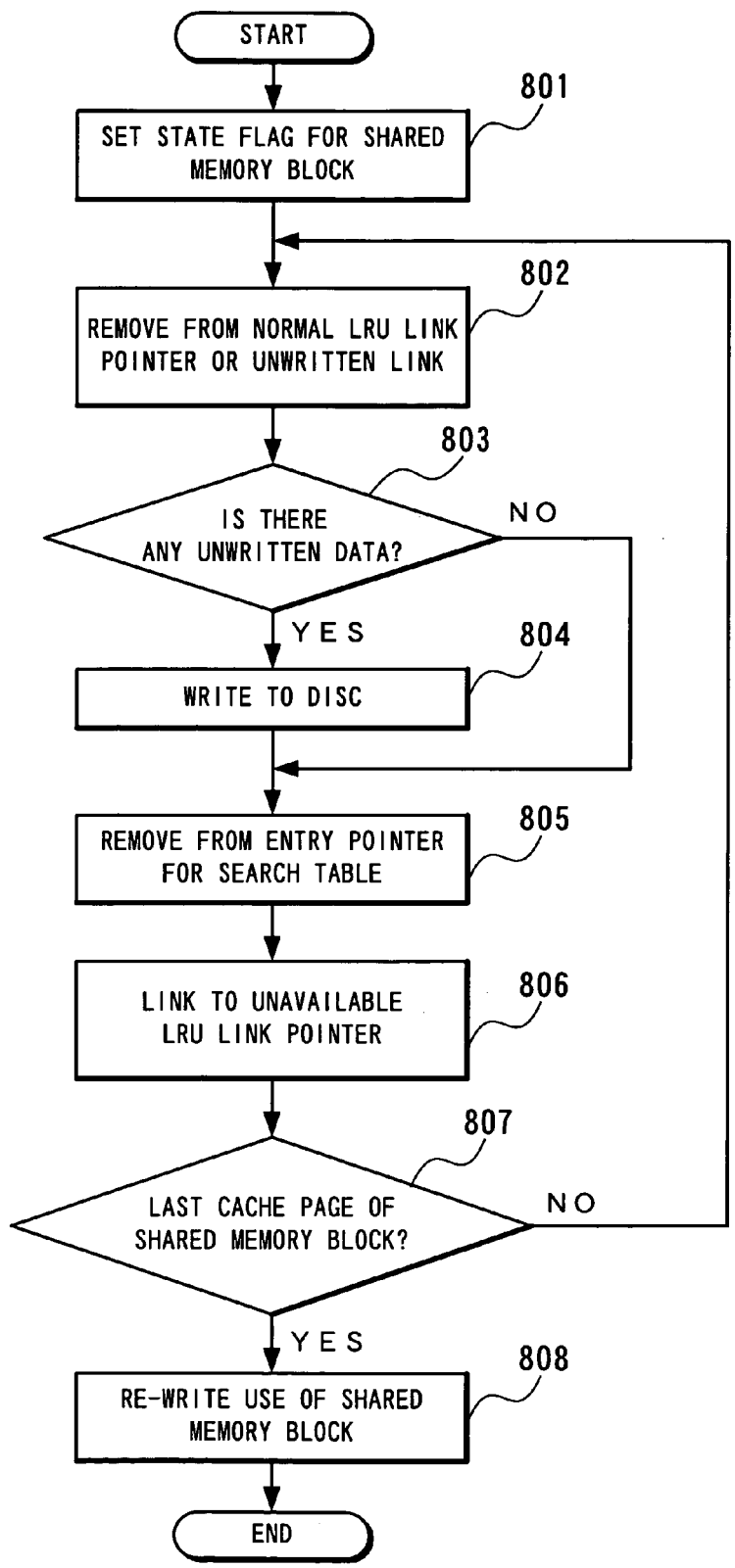
FIG. 8 is a flow chart illustrating the use change operation of the disc array unit according to the first embodiment of the present invention.

The process of changing the use of a shared memory block to an extended cache control area 101 immediately after the addition of a shared memory 22 is the same as the process of changing the use of a shared memory block to a management information area for a solution illustrated in FIG. 8. In other words, the use is simply set to an extended cache control area 101, in place of a management information area for a solution. If the added shared memory 22 is removed in the future to return to the initial state, the extended cache control area 101 will be used as a cache memory. The use change process to take place in this case will be the same as the process shown in FIG. 9.

Figure 9:
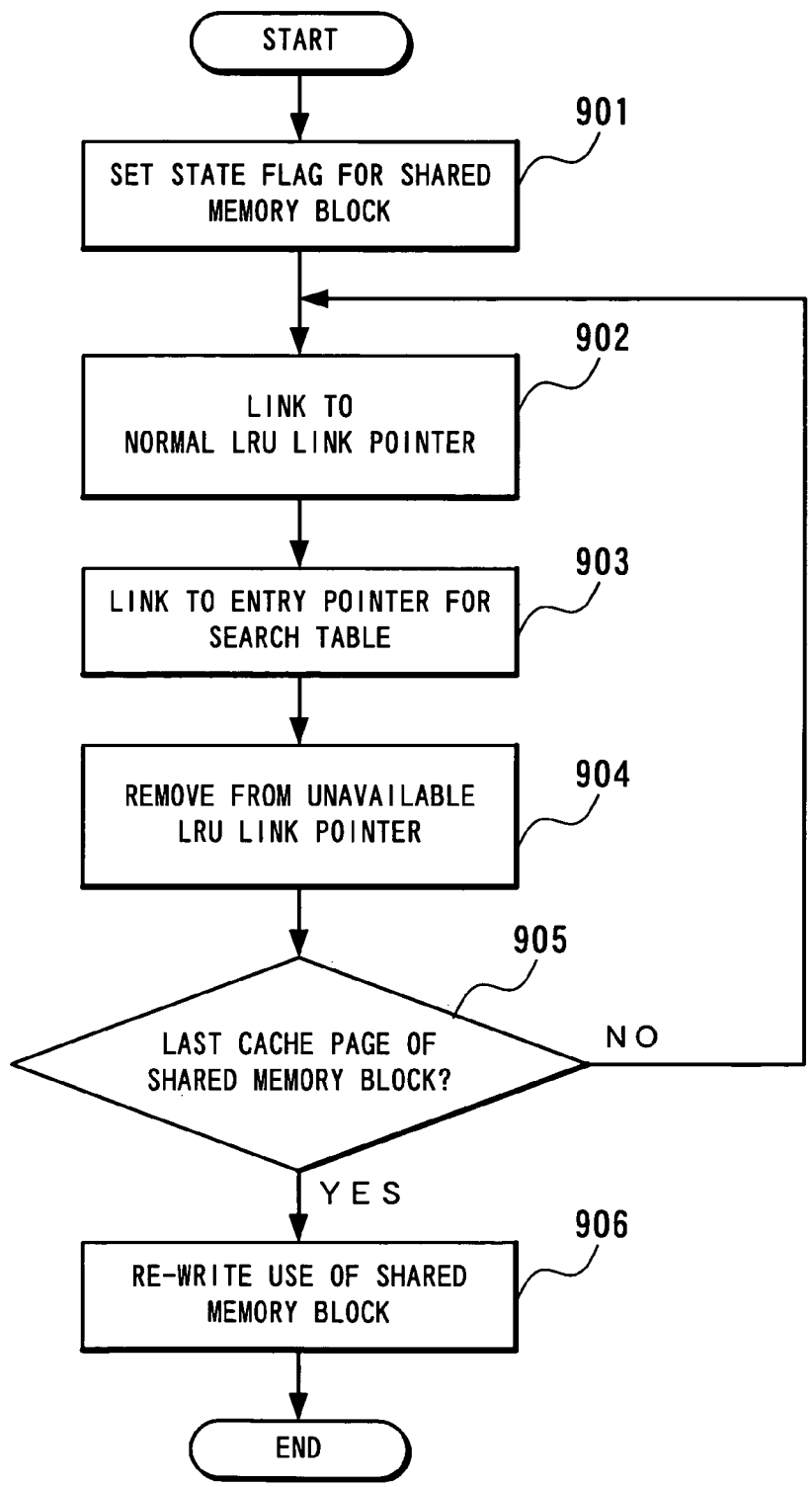
FIG. 9 a flow chart illustrating the use change operation of the disc array unit according to the first embodiment of the present invention.

The operation of changing the use of a shared memory block created by extending the shared memory 22 to a management information area for a solution and the operation of returning this use back to a cache memory are exactly the same as the operations shown in FIGS. 8 and 9.

Figure 7:
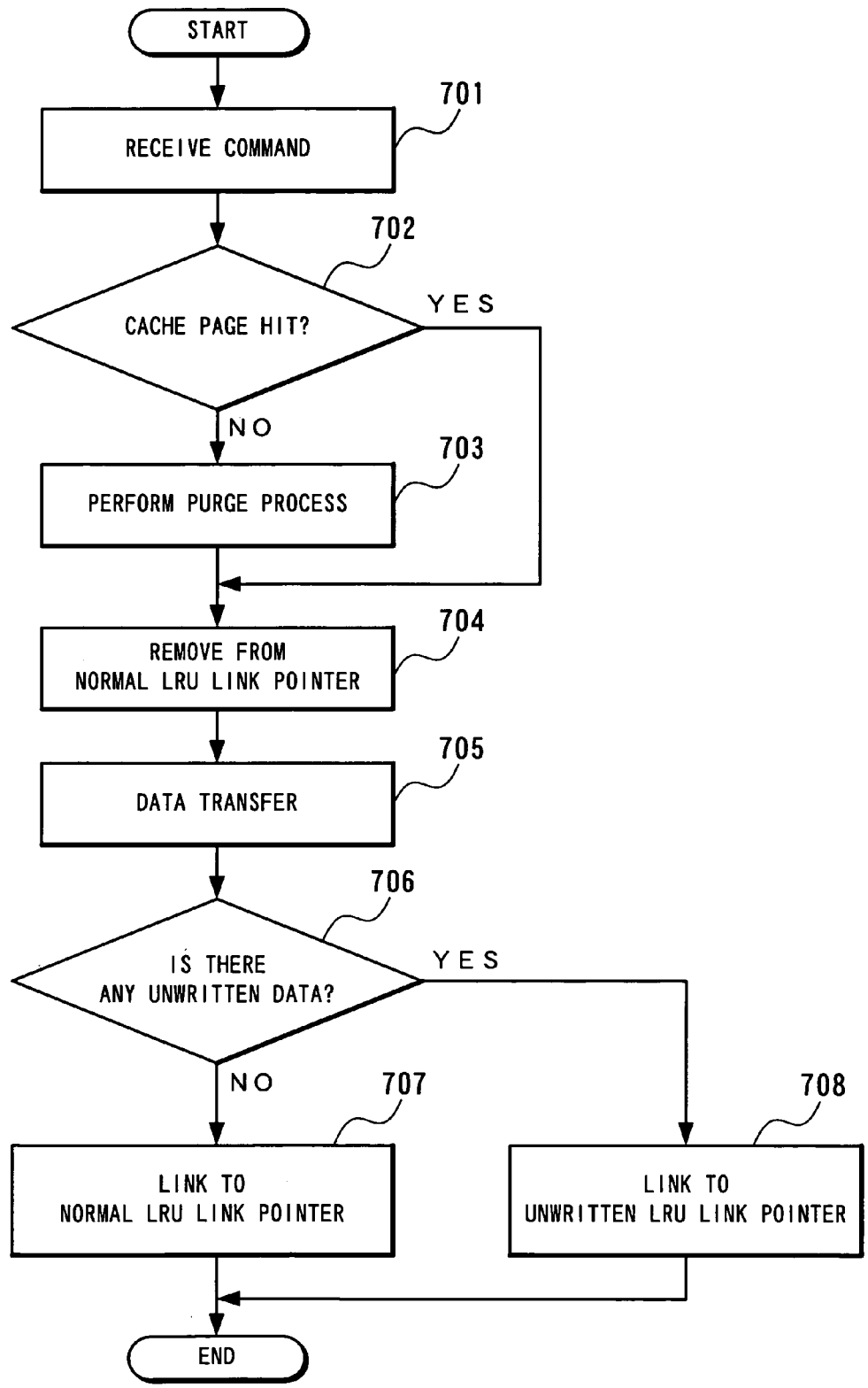
FIG. 7 is a flow chart illustrating the cache control operation of the disc array unit according to the first embodiment of the present invention.

As shown in FIG. 14, the contents of extended cache control information 1010 stored in the extended cache control area 101 now include link pointers and search link pointers of the cache pages for the shared memory blocks #4 to #7, thereby enabling cache control as described in FIG. 7 to be performed on the shared memory blocks #4 to #7.

The contents of cache control information 320 for the cache control area 32 are the same as the information according to the first embodiment, shown in FIG. 6.

According to the second embodiment, when the shared memory is extended, it becomes possible to use the memory efficiently because a memory control area added correspondingly to the extended memory capacity will be set dynamically.

In the foregoing, a disc array unit according to the present invention has been explained with focus on a form of management, wherein the management program 1000 is run by the computer processing part (CPU) as a controller to manage each shared memory block of a shared memory 22 as a cache memory or a management area for a solution. However, it should be apparent to those skilled in the art that the functions described above can also be realized by use of hardware.

While the present invention has been described by taking preferred embodiments and operations as examples, it should be noted that the present invention is not limited to the preferred embodiments and operations described above and that it can be implemented with a variety of modifications without departing from the spirit and scope of its technical principle.

As described above, according to the present invention, it is possible to realize a disc array unit with higher availability and scalability because, when an additional function (solution) is incorporated, a particular area of the shared memory being used as a cache memory can be set automatically for use for the operation of the additional function and thus the use change can be achieved dynamically without stopping the disc array unit.

In other words, when a new solution is enabled during the operation of the disc array unit, an area of the shared memory which has been used as a cache memory can be re-allocated dynamically to a new use as a solution management area, thereby allowing the user to begin using the new solution without first changing the memory map and then restarting the unit even if the new solution consumes a large management area.

Furthermore, the present invention can increase efficiency in memory utilization by enabling a particular area existing before extension in the shared memory to be set automatically as an area to store control information related to the areas to be added by the extension, because it becomes possible that, when the shared memory is extended, a memory control area added correspondingly to the extended capacity can be set dynamically.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A disc array unit which allows a user to implement an additional function with specific capabilities as necessary, comprising:
    a shared memory;
    a controller connected to the shared memory;
    a host connected to the controller; and
    a disk connected to the controller;
    wherein the shared memory comprises a shared memory block management area, a cache control area, and a plurality of shared memory blocks,
    wherein the controller is adapted to assign the plurality of shared memory blocks a cache memory that temporarily stores data transferred between the host and the disk, or as a storage of management information needed to implement the additional function to be incorporated in the disc array unit.

2. The disc array unit as set forth in claim 1, further comprising:
    when said additional function is incorporated, said controller for setting being arranged and configured to automatically shift said particular area in the shared memory functioning as said cache memory to functioning as said storage of management information needed to realize said additional function; and
    when said additional function is removed, said controller automatically shifting said particular area in the shared memory from functioning as the storage of management information to realize said additional function to functioning as said cache memory.

3. The disc array unit as set forth in claim 1, further comprising:
    means for removing from control for said function as a cache memory a particular area in said shared memory, which has been set to said function as said storage of management information to implement said additional function.

4. The disc array unit as set forth in claim 1, further comprising:
    if any unwritten data exists in said cache memory, which is now set to said function as the storage of management information to implement said additional function, means for purging said function as the cache memory after writing said data to a disc.

5. The disc array unit of claim 1, wherein the shared memory block management area is adapted to store a shared memory block information, the shared memory block management information comprising a shared memory block use information, and a state flag that indicates if one of the plurality of shared memory blocks assigned as the storage of management information is shifted to another assignment.

6. The disc array unit of claim 1, wherein the cache control area comprises a cache page management table, a search table, and a link pointer.

7. The disc array unit as set forth in claim 1, further comprising:
    means for providing in part of said shared memory a management area for storage of management information needed to manage functions of different areas in said shared memory; and
    changing a particular area in said shared memory for said cache memory or storage of management information needed to implement said additional function, by specifying said cache memory or said additional function as a function of said particular area for indication in said management area.

8. The disc array unit as set forth in claim 7, further comprising:
    in management information concerning said management area, means for providing a flag to indicate if said area is shifting to another function.

9. The disc array unit as set forth in claim 1, further comprising:
    when said shared memory is extended, means for setting automatically a particular area, existing in the shared memory before extension, as an area for storage of control information concerning the area to be newly created as a result of the extension of said shared memory.

10. The disc array unit as set forth in claim 9, further comprising:
    means for purging data contained in a particular area in the shared memory functioning as said cache memory; and setting automatically such particular area as an area for storage of control information concerning the area to be newly created as a result of the extension of said shared memory.

11. A disc array unit which can manage a shared memory as a plurality of shared memory blocks, each of which consists of a group of cache pages, and perform cache control on these cache pages through least recently used (LRU) link pointers, comprising:
    the shared memory;
    a controller connected to the shared memory;
    a host connected to the controller; and
    a disk connected to the controller,
    wherein the controller is adapted to assign the plurality of shared memory blocks as a cache memory that temporarily stores data transferred between the host and the disk, or as a storage of management information needed to implement the additional function to be incorporated in the disc array unit, wherein the plurality of shared memory blocks comprises the group of cache pages if the plurality of shared memory blocks is assigned as a cache memory, wherein the shared memory comprises a shared memory block management area, a cache control area, and the plurality of shared memory blocks, and wherein the cache control area comprises:
said LRU link pointers; and
an unavailable link pointer to indicate that an area of said shared memory is not available,
wherein if said shared memory block is not assigned as said cache memory, said shared memory block can be prevented from being assigned as cache memories by re-linking all the cache pages in said shared memory block from said LRU link pointers to said unavailable link pointer individually.

12. A disc array unit management method which allows a user to implement an additional function with specific capabilities as necessary, said method comprising:

assigning a plurality of shared memory blocks in a shared memory as a cache memory that temporarily stores data transferred between a host and a disk, or as a storage of management information needed to implement the additional function to be incorporated in the disc array unit, wherein if the plurality of shared memory blocks in the shared memory is to be assigned as the storage of management information from being assigned as the cache page, further comprising:
setting a state flag of the plurality of shared memory block to indicate that the plurality of shared memory block is shifting from being assigned as the storage of management information to being assigned as the cache page;
removing a cache page stored in the plurality of shared memory block from a least-recently used pointer (LRU) or an unwritten link pointer;
determining if the removed cache page contains a data that is to be written to the disc;
removing a link to the cache page from an entry pointer of a search table
linking the cache page to an unavailable LRU link pointer; and
changing an assignment information for the plurality of shared memory block from a cache memory to a management information.

13. The disc array unit management method as set forth in claim 12, further comprising:
setting automatically, if said additional function is incorporated, a particular area in the shared memory functioning as said cache memory to said function as said storage of management information needed to realize said additional function; and when said additional function is removed, setting automatically a particular area in the shared memory functioning as said storage of management information to realize said additional function to said function as said cache memory.

14. The disc array unit management method as set forth in claim 12, further comprising:
from control for functioning as a cache memory, removing a particular area in said shared memory which had been functioning as said storage of management information to implement said additional function.

15. The disc array unit management method as set forth in claim 12, further comprising:
if any unwritten data exists in said cache memory, which is now set to said function for storage of management information to implement said additional function, purging said cache memory after writing said data to a disc.

16. The disc array unit management method as set forth in claim 12, further comprising:
providing in part of said shared memory a management area for a storage of management information needed to manage functions of different areas in said shared memory; and
changing a particular area in said shared memory for said cache memory or storage of management information needed to implement said additional function, by specifying said cache memory or said additional function as a use of said particular area for an indication in said management area.

17. The disc array unit management method as set forth in claim 16, further comprising:
in management information concerning said management area, providing a flag to indicate if said area is shifting to another function.

18. The disc array unit management method as set forth in claim 12, further comprising:
when said shared memory is extended, setting automatically a particular area, existing in the shared memory before extension, as an area for storage of control information concerning the area to be newly created as a result of the extension of said shared memory.

19. The disc array unit management method as set forth in claim 18, further comprising:
purging data contained in a particular area in the shared memory functioning as said cache memory; and
setting automatically such particular area as an area for storage of control information concerning the area to be newly created as a result of the extension of said shared memory.

20. A disc array unit management method to manage a shared memory as a plurality of shared memory blocks, each of which consists of a group of cache pages, and to perform cache control on these cache pages through use of least recently used (LRU) link pointers, said method comprising:
if said plurality of shared memory block is not to be assigned as a cache memory, preventing said plurality of shared memory block from being assigned as the cache memory by re-linking the group of cache pages belonging to said plurality of shared memory block from said LRU link pointers to an unavailable link pointer, to indicate that the plurality of shared memory block is not available to be assigned as said cache memory.

21. A machine-readable disc array unit management program run by a disc array unit which allows a user to implement an additional function with specific capabilities as necessary, said program comprising:
assigning a plurality of shared memory blocks in a shared memory as a cache memory that temporarily stores data transferred between a host and a disk, or as a storage of management information needed to implement the additional function to be incorporated in the disk array,
wherein if the plurality of shared memory blocks in the shared memory is to be assigned as the storage of management information from being assigned as the cache page, further comprising:
setting a state flag of the plurality of shared memory block to indicate that the plurality of shared memory block is shifting from being assigned as the storage of management information to being assigned as the cache page;

removing a cache page stored in the plurality of shared memory block from a least-recently used pointer (LRU) or an unwritten link pointer;

determining if the removed cache page contains a data that is to be written to the disc;

removing a link to the cache page from an entry pointer of a search table linking the cache page to an unavailable LRU link pointer; and changing an assignment information for the plurality of shared memory block from a cache memory to a management information.

22. The disc array unit management program as set forth in claim 21, further comprising:

when said additional function is incorporated, setting automatically a particular area in the shared memory functioning as said cache memory to functioning as said storage of management information needed to realize said additional function; and when said additional function is removed, setting automatically a particular area in the shared memory functioning as said storage of management information to realize functioning as said cache memory.

23. The disc array unit management program as set forth in claim 21, further comprising:

providing in a part of said shared memory a management area for a storage of management information needed to manage functions of different areas in said shared memory; and changing a particular area in said shared memory for said cache memory or storage of management information needed to implement said additional function, by specifying said cache memory or said additional function as a function of said particular area for indication in said management area.

24. A disc array unit management program which manages a shared memory as a plurality of shared memory blocks, each of which comprises a group of cache pages, and performs cache control on these cache pages through a function of least recently used (LRU) link pointers, comprising:

if said plurality of shared memory block is not to be assigned as a cache memory, preventing said plurality of shared memory block from being assigned as the cache memory by re-linking the group of cache pages belonging to said plurality of shared memory block from said LRU link pointers to an unavailable link pointer, to indicate that the plurality of shared memory block is not available to be assigned as said cache memory.

* * * * *